March 25, 1969  P. E. WEBER  3,434,785

BEAM SWEEPING OPTICAL DISTANCE METER

Filed May 18, 1964  Sheet 1 of 4

INVENTOR.
PAUL E. WEBER
BY *Price & Heneveld*
ATTORNEYS

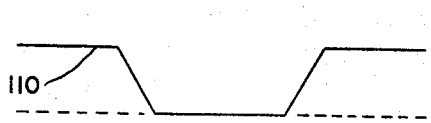
FIG. 8a
FIG. 8b
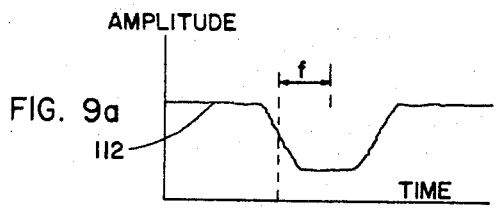
FIG. 9a
FIG. 9c
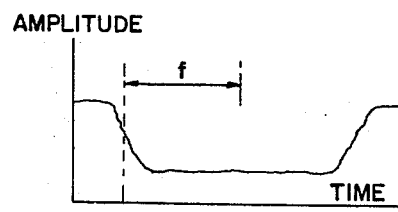
FIG. 9b
FIG. 9d United States Patent Office 3,434,785
Patented Mar. 25, 1969

3,434,785
BEAM SWEEPING OPTICAL DISTANCE METER
Paul E. Weber, Ypsilanti, Mich., assignor to
Lear Siegler, Inc.
Filed May 18, 1964, Ser. No. 368,204
Int. Cl. C01c 3/08; H01j 39/12, 3/14
U.S. Cl. 356—4
7 Claims

ABSTRACT OF THE DISCLOSURE

A distance measuring apparatus in which means are provided for forming a constant width optical beam which is oscillated at a controlled angular speed, through a predetermined angle. The beam is oscillated from a first point so as to sweep across a second point, the distance of which from said first point is unknown. The time interval required for the constant width beam to cross the second point is proportional to the distance between said first and second points. Accordingly, measurement of such time interval will determine the unknown distance.

---

Figure 1:
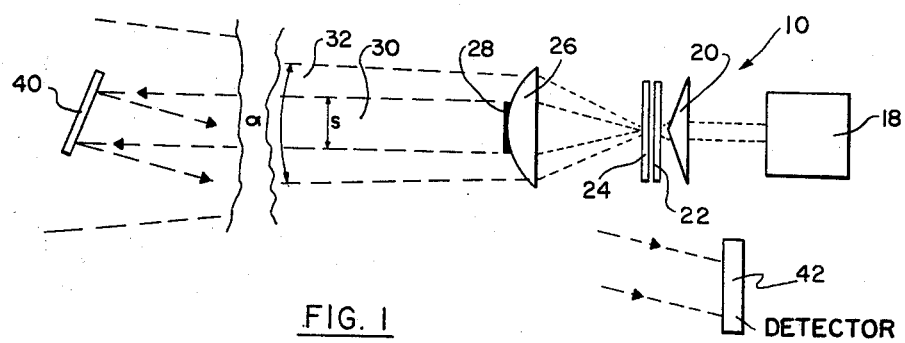

This invention relates to a distance measuring instrument, and more particularly to an optical distance measuring instrument employing a constant width, sweeping, optical beam.

Distance measuring instruments useful, for example, to surveyors, customarily utilize either triangulation techniques or radiation transmission time measurement. The latter type system measures the time for visible light or for radiation in the microwave region to pass the distance to be measured. This time is used in calculating the distance covered, assuming the radiation speed to be constant and known. Since the velocity of the radiation is so great, the time interval for signal transmission is tremendously small. Therefore, the time increment must be measured with extreme accuracy to be meaningful. Equipment capable of doing this is very expensive, usually costing at least $15,000. Obviously, this equipment is employed only in exceptional circumstances, and usually only for long distances. It is priced completely out of the range of the ordinary surveying team. Further, even when such equipment is used for measuring long distances to which it is especially suited, it is subject to inaccuracy due to variation of the ambient index of refraction. The discrepancy is due to the fact that the true velocity of light varies with the index of refraction of the medium through which it is passing. More specifically, $c = co/n$ where $c$ = the true velocity of light,
$co$ = the speed of light in a vacuum, and
$n$ = the index of refraction Since the air in the intermediate region between the two points of the distance to be measured normally varies from zone to zone in temperature and humidity, the exact true velocity of light is rarely, if ever, known for certain. This can be especially disadvantageous when measuring short distances since a small difference in velocity can seriously affect the results.

Triangulation methods, on the other hand are generally relatively inexpensive. They are best suited to short distances. They are, however, inferior to electronic methods in accuracy. Also, factors such as uneven terrain, inaccessibility, trees, water, etc. often make triangulation methods either impossible or highly difficult and inaccurate to employ. Yet, equipment for triangulation is inexpensive, and therefore widely employed by ordinary surveying teams, in spite of its limitations.

As a consequence of these factors, there is a definite need for a relatively inexpensive, distance measuring apparatus capable of very accurately and very easily measuring distances of intermediate ranges, for example 20 to 1,000 meters or i.e., about 50 to 4,000 feet.

It is therefore an important object of this invention to provide such an apparatus.

Another object of this invention is to provide a distance measuring instrument employing an optical beam to measure the distance, but with the measurement being independent of the speed of light. Therefore, elaborate and expensive equipment for measuring the speed of light is not necessary. The results are further relatively unaffected by changes in refractive index of the ambient air.

Still another object of this invention is to provide a beam sweeping optical distance meter within the financial range of ordinary surveying teams. It moreover is relatively simple to use while achieving results much more accurate than triangulation techniques.

Another object of this invention is to provide an optical, beam sweeping, distance measuring unit with a transmission time interval to be measured in the easily measured range of about $10^{-7}$ seconds. The time can therefore be measured with relatively inexpensive equipment. The unit is compact in construction, and relatively lightweight, to therefore be highly portable and easily set up for measuring.

Figure 2:
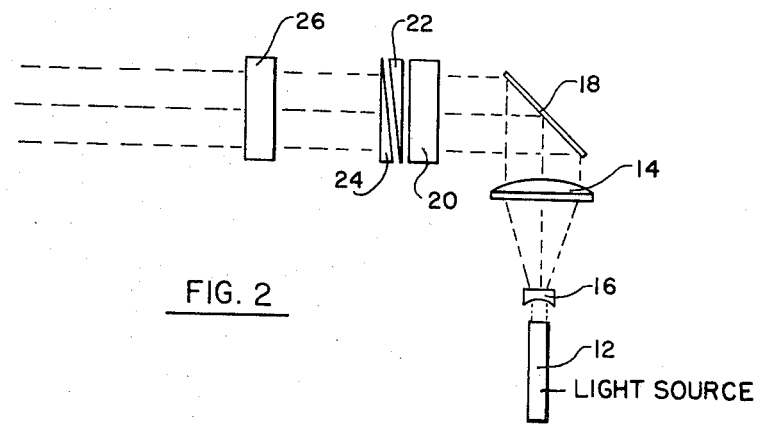
Figure 4:
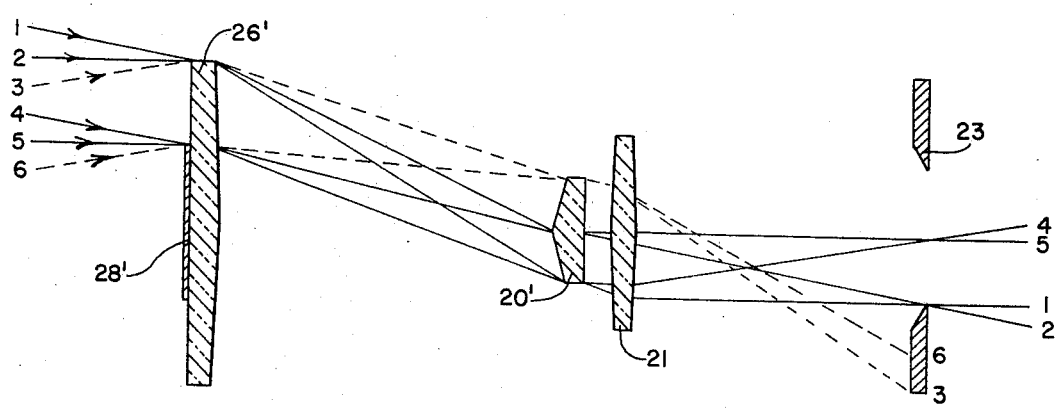
Figure 3:
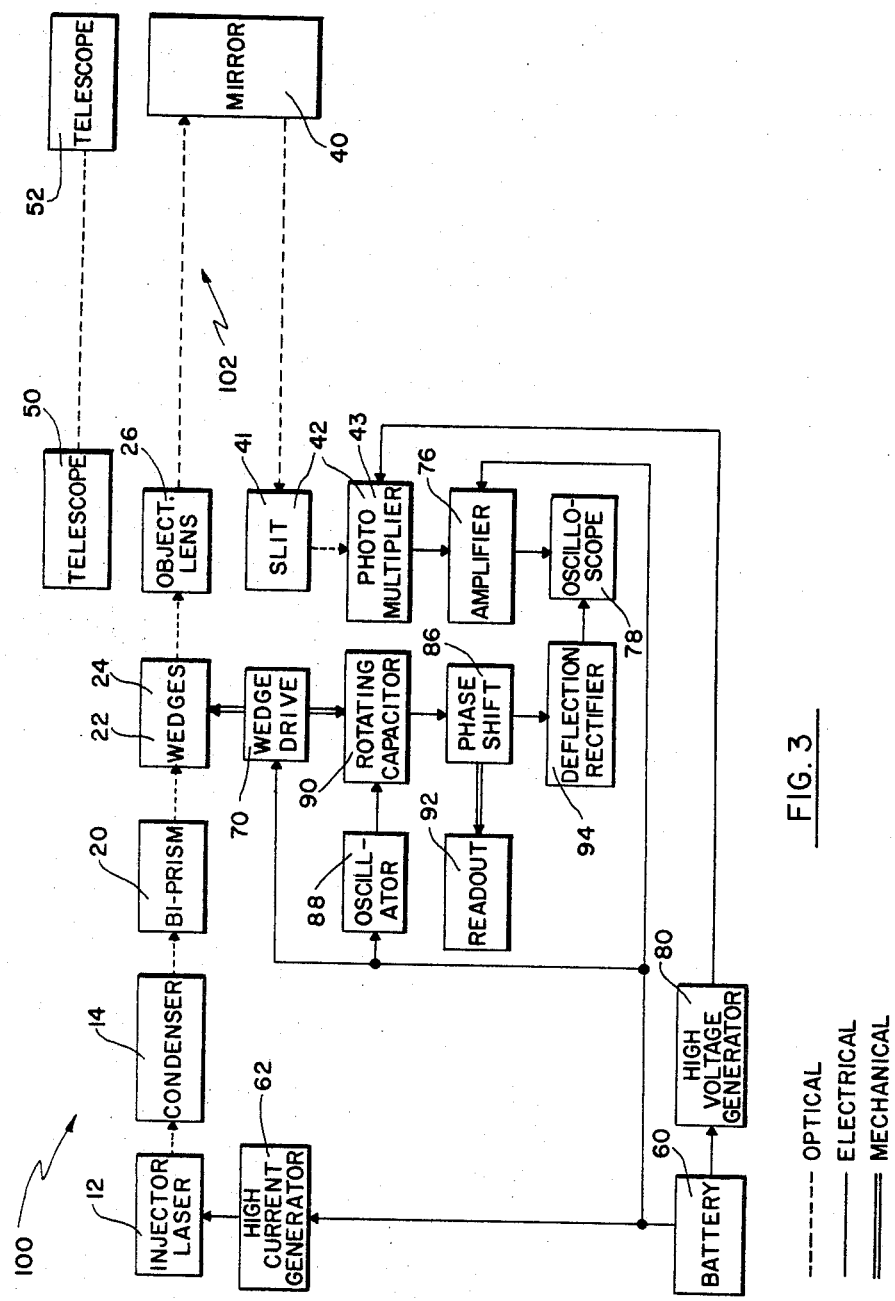
Figure 5A:
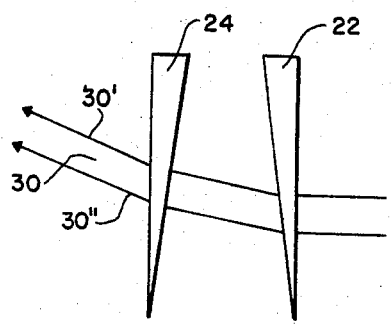
Figure 5C:
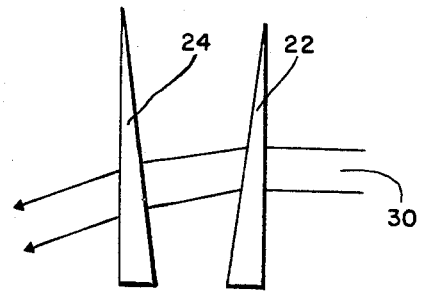
Figure 5B:
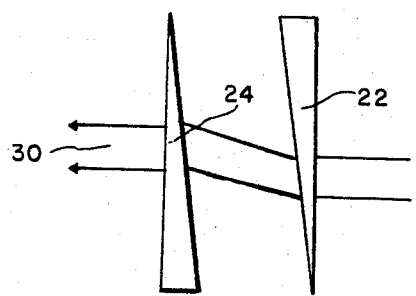
Figure 6:
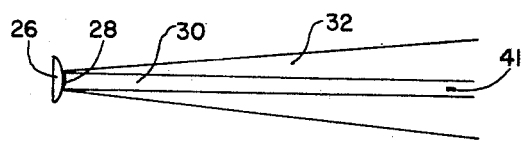
Figure 7:
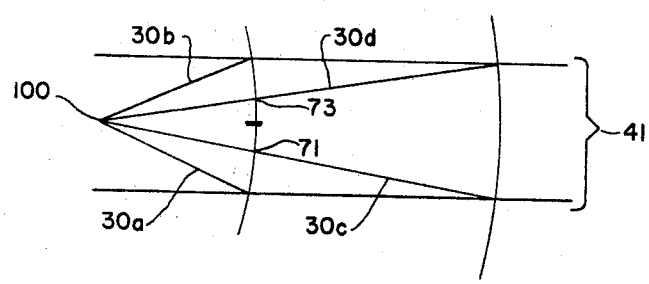

These and several other objects of this invention will become apparent upon studying the following specification in conjunction with the drawings in which:

FIG. 1 is a side elevational view of the optical system of this invention;
FIG. 2 is a plan view of the system in FIG. 1;
FIG. 3 is a block schematic diagram of the system of this invention;
FIG. 4 is an optical diagram of a portion of the optical system used to form a beam of constant width, with ray traces shown;
FIG. 5a, FIG. 5b and FIG. 5c are related figures showing the sequential action of the counter rotating double wedge beam oscillator;
FIG. 6 is a diagrammatic view of the beam of this invention;
FIG. 7 is a diagrammatic view showing the time measurement function of this invention;
FIG. 8a is a graphic illustration of an ideal oscilloscope trace representing an impulse of a sweeping beam according to this invention;
FIG. 8b is a graphic illustration of an actual oscilloscope trace relative to FIG. 8a;
FIG. 9a is a graphic illustration of an oscilloscope trace representing an impulse caused by an optical beam sweep over a relatively long distance;
FIG. 9b is a similar trace resulting from a measured shorter distance;
FIG. 9c is a graphic oscilloscope trace crossover of two traces from FIG. 9a; and
FIG. 9d is a diagrammatic oscilloscope trace crossover from two traces from FIG. 9b.

Basically the inventive concept employs a constant width optical beam oscillating at a controlled angular speed through a predetermined angle from a first point to sweep across a second point between which the distance is to be measured. The time of passage of the beam to sweep past the second point is measured and the distance between the points calculated using that time value.

Alternatively, and preferably, the constant width optical beam is reflected from the second point back to a detector at the first point so that the duration of beam sweep passage is measured at the point of beam origin.

Referring now specifically to the drawings, the inventive system basically includes means to form an optical beam of constant width, means to oscillate the beam in a sweep past a distant point, and means to detect the beam sweep and indicate the duration thereof.

Referring again to FIGURES 1 and 2, an intense light source is indicated at 12 which may commonly comprise an incandescent lamp or a laser. Its beam is passed through a cylindrical, plano-convex collimating lens 14, after being focused thereon by a plano-concave lens 16. The collimating lens of course creates a beam of parallel rays. This light, for convenience may be reflected from a plane mirror surface 18 through a biprism 20. This optically transparent biprism has a planar entry face and a bisected outlet side formed of two planar surfaces at a small obtuse angle with its apex in the symmetrical center of the prism. The light passes through a pair of counter rotating, optically transparent wedges 22 and 24 and an objective cylindrical lens 26. The central portion of the objective lens 26 includes an opaque area 28 of predetermined width to produce a resulting central dark zone 30 and straddling or surrounding light zone 32. The objective lens has a width twice that of the opaque area. The angle of the biprism outlet faces is such that when the linear apex or tip of the biprism is at the focal point of the objective lens, an optical ray passing the edge of the opaque area should be bent along the optical axis. The combination, and especially the biprism 20 and objective lens 26 with its darkened central portion, produces the constant width darkened beam zone 30 in the optical beam, with a constant diameter S over the extent of its length. This is in contrast to the usual divergent optical beam. In fact, the straddling light zone 32 on both sides of the dark central zone has a divergence angle alpha. However, it has been proven by actual experiment and by computer calculations that the diameter S of the darkened zone is constant over its length. The light traces adjacent this zone are parallel. It will be realized that by making the biprism three-dimensional, i.e. conical, and making the objective lens spherical instead of cylindrical, the darkened area will be a rod. However, for this invention it is sufficient to have the two dimensional variation with objective lens 26 cylindrical, and biprism 20 elongated, to produce a darkened zone of an exact width S and resembling a planar wall.

Typical of a preferred light source is a gallium arsenide injection laser with a wave length of emitted light equal to about 0.8383 micron, with an output of about 1.5 watts from an area of about $5 \times 10^{-3}$ square centimeters.

A typical biprism is a 10 millimeter diameter biprism with a deflection angle of about 5 degrees 43 minutes. This requires an objective lens of about 10 inches with a focal length of about 2.5 inches. This is preferably a single lens corrected for spherical abberations.

The two rotating wedges 22 and 24 oscillate the beam 30 back and forth. These are used according to conventional techniques. These wedges may be driven by any suitable rotating means.

Referring to FIG. 5, the sweeping of the optical beam back and forth by the counter rotating wedges is illustrated at A, B and C. When the two wedges 22 and 24 are in the position illustrated in FIG. 5a, the constant width dark zone 30 illustrated by the trace lines 30′ and 30″ will be bent from their entry angle to the exaggerated angle illustrated. When the counter rotating wedges are in mutually compensating position, however, the light traces will be deflected slightly, but emerge at the same optical angle as their entry axis. When the wedges are in the opposite correlation as that in FIG. 5a, as shown in FIG. 5c, the traces will be bent in the opposite direction as that in FIG. 5a. Therefore, by continuously counter rotating these wedges the beam oscillates back and forth from the extremes illustrated in FIGS. 5a and 5c, both of which are of course exaggerated. Ordinarily, it has been found that the angle of oscillation for the beam sweep should be about plus or minus 0.5 degree with a sweep rate of 0.2 degree per second being acceptable for the angular speed, i.e. about 0.0035 radian per second. These are of course only representative values with the variations being many.

In the broader aspects of this invention, the beam oscillator may be other than double wedge apparatus. Mechanical or electro-mechanical oscillating means and/or optical means may be employed. However, due to the high sweep frequency desired for accurate operation the smoothly functioning, nonvibratory, rotating wedges are preferred.

This beam oscillating mechanism is placed at one point the distance from which to a second point is desired. At the second point at the opposite end of the distance, a detector is placed to receive the oscillating beam as the beam sweeps back and forth across it. This detector is normally a tiny slit having a photo-multiplier therebehind. An oscilloscope or other indicating means is electronically coupled with the detector.

Rather than placing the detector at the second point, however, it is preferable to place a reflecting mirror surface 40 at the second point, to reflect the beam back to the first point where the detector 42 is mounted. This enables the detector equipment to be synchronized with the beam output equipment without extending electrical cables between the two points as would otherwise be necessary for synchronization. Consequently, the entire operating mechanism, except for a reflecting surface and its support stand, is mounted at the starting point of the beam. The detector 42 includes a vertical slit extending such that, as prisms 22 and 24 rotate in counter directions, the beam sweeps back and forth over the slit so that the darkened zone 30 passes the slit in a particular time interval each time.

The explanation of the constant width dark zone will be more specifically understood from the illustration given in FIG. 4. If, for example, a cone shape prism 20′ is placed with its central lip on the focal point of an objective lens 26′ and if the central portion of the objective lens is coated with an opaque material 28′, the rays numbered 1, 2, 3, 4, 5, and 6 and passing in the direction shown by arrows will behave according to a predetermined pattern. For convenience, a condenser lens 21 is placed coaxial with the cone shape prism, and a diaphragm 23 is placed coaxial with all of the elements for purposes of explanation. The diameter of the diaphragm is the same size as the image of the objective imaged by the condenser lens. The reflection angle of the cone shape prism is such that the rays from the edge of the darkened zone 28′ extending toward the top of the cone shape prism will emerge parallel with the optical axis (ray number 5). The resulting actions occur when the rays are directed as illustrated on the diagram. All rays entering the system at an angle between the optical axis and a half field angle outwardly from the the axis will pass through the diaphragm as illustrated by rays 1 to 2 and 4 to 5. Further, all rays entering the system at an angle between the optical axis and a half field angle inwardly from the axis will be stopped by the diaphragm as illustrated by the rays 3 and 6. All rays with an angle, with respect to the optical axis, larger than the half field angle entering the objective will not be transmitted toward the opening of the diaphragm. If now, a light source is applied from the opposite end of the system, i.e. the right hand end as illustrated in FIG. 4, the rays passing in the opposite direction and passing through the cone shape prism 20′ and the objective lens 26′ around the darkened central zone 28′ will never converge toward the central darkened zone on the opposite side of the darkened area 28′. Rather, all rays will either be parallel to the optical axis or divergent with respect thereto. As a consequence, referring back to FIGS. 1 and 2, note that the system shown in FIGURE 4 is in effect equivalent system when the light is applied in the reverse direction.

As best seen in FIGURE 2, light from source 12 will, therefore, pass through cylindrical collimating lens 14, which causes the light beam to emerge substantially parallel, to the optical axis to be reflected from mirror 18 and through biprism 20, and hence, through objective lens 26 with its darkened opaque constant portion 28. Referring again to FIGURE 1, the beam 30, which is the darkened portion of the light beam, has a constant width S over its length, even when reflected from a very great distance at mirror 40 back to the starting point at detector 42. It will be realized, therefore, that by oscillating this constant width optical beam back and forth across a slit, if the angular rate of movement of the beam is constant, i.e., at a predetermined angular velocity, the amount of time it will take the constant diameter beam to sweep past the slit will depend upon the distance of the slit from the light source. This, therefore, is the basic principle employed in this apparatus.

A block diagram of the complete system is illustrated in FIG. 3. The emitter section of apparatus 100 is normally placed at a first point and a reflector apparatus 102 is positioned at a second point remote from said first point; the distance between said first and second points being that which it is desired to measure. Preferably, a pair of telescopes 50 and 52 are mounted on respective supports for the emitter and reflector mechanisms to enable the reflecting mirror 40 receiving the oscillating optical beam from the objective lens 26 to be aligned exactly to reflect the beam back to the slit 41 behind which photo-multiplier 43 is mounted to form the detector 42.

A suitable battery power supply 60 is used to operate a high current generator 62. This powers injection laser 12 supplying the light. This battery also operates the wedge drive 70 which rotates the wedges in counter directions.

The signal from the photo-multiplier 43 is preferably fed into an amplifier 76, and then to an oscilloscope 78 to portray the intermittent signals. The photo-multiplier is preferably powered by high voltage generator 80 also operated by battery 60.

Referring to FIG. 6, the optical beam emitted from objective lens 26 and having central dark zone 30 and light divergent zone 32 is shown (for illustrative purposes) cooperating with a slit detector 41 at the second point rather than reflecting it back to the first point. As the dark zone is swept back and forth across the slit with the remainder of the light beam, it will be understood that the closer the slit is to the source, the longer the time will be to sweep the dark zone past the slit. This is shown more specifically in FIG. 7, where the ray traces 30a, 30b, 30c and 30d represent the dark zones in various stages and at various distances. Point 100 represents the emitter, with the beam moving through an angle at a constant angular velocity.

Assuming for the moment that the space 41 represents the slit width at a particular distance, it will be seen that the time for sweeping the beam from 30c to 30d across the slit width when the slit is located far from emitter 100 will be substantially less than the time to sweep this same slit width when the slit is placed closer to the emitter. With the slit placed close to the emitter the sweeping beam will only have passed through an arc between points 71 and 73, at the distance of the slit from the emitter, in the same time interval it takes to cover an arc spanning the distance 41 at a point more remote from the emitter. It will also be appreciated that the amount of time is related to the width of the beam as well as the distance of the slit detector from the emitter. This relationship is as follows:

$$\Delta T = S/\omega D$$

Where:

$\Delta T$ is the time to sweep past the slit,
S equals the width of the constant width dark zone,
$\omega$ is the angular velocity of the sweep, and
D equals the distance to be measured between the emitter and the detector (or if reflected back to the emitter, equals twice this distance measured).

If time is in seconds, beam width is in centimeters, angular velocity is in radians per second, and distance is in centimeters, it will be seen that the equation can be solved for the distance when the time is measured, since the angular velocity and the beam width are predetermined and known. To determine the distance, therefore, the beam of a predetermined width is swept back and forth at a predetermined angular velocity and the time of passage of the beam past the detector slit is measured. With S and $\omega$ remaining constant D is inversely proportional to $\Delta T$ and the apparatus used to measure $\Delta T$ (such as the oscilloscope 78) can be calibrated to directly read out D. Referring to FIGS. 8a and 8b, the rapidly oscillating beam should produce an ideal oscilloscope trace like that illustrated at 110 in FIG. 8a. In actuality, the trace appears more like that illustrated at 112 in FIG. 8b. The readout accuracy of the oscilloscope picture may be increased by overlapping the traces with a shift of phase $f$. This enables an exact distance to be measured for the pulse waves. This is illustrated in FIGS. 9a, 9b, 9c and 9d. Thus, the oscilloscope trace 112 for a short time interval as illustrated in FIG. 9a may be overlapped in the manner illustrated at 112' in FIG. 9c. The distance between the points of overlapping can be determined very accurately to measure the specific time of scanning. This overlapping is best accomplished by centering the pulse traces vertically and shifting the phase until the point of overlap is centered vertically.

This phase shift is achieved according to conventional methods. A signal from oscillator 88 (FIG. 3) is fed to a rotating capacitor 90, and hence to a phase shifter 86 to a deflection rectifier 94, and to the oscilloscope 78. The phase shifter may be mechanically linked to a readout unit 92 if desired. To further increase the readout accuracy, the overlapping is digitized to obtain a digital readout of the distance measured. The high accuracy of the unit is maintained even though the sweep speed should change slightly, by allowing the sweep drive to drive the electron beam sweep of the oscilloscope as well as the sweep wedges. This keeps the two sweep speeds synchronized at all times, causing any sweep speed changes to have no influence on the measurement of the distance.

Referring again to FIG. 9, FIGS. 9b and 9d illustrate the measurement of a distance closer than FIGS. 9a and 9c. Accordingly, the time for passage of the beam over the slit is longer. Yet, it can be accurately measured with this cross over technique.

It will be obvious to those having ordinary skill in the art that this inventive method and combination is truly unique in providing an intermediate range measurement system of high accuracy. The unit is independent of air index of refraction. It need not employ the triangulation techniques. It further is relatively inexpensive to produce. It can be relatively compact and lightweight in construction. The emitter and detector can be enclosed in one housing to avoid external electrical connections. The emitter and receiver unit can be mounted like any theodolite on a tripod. Free rotation about a vertical axis can be at 360 degrees and around a horizontal axis at a chosen value, for example plus or minus 20 degrees. Alignment of the mirror with the unit can be readily made with the telescopic sight as explained above.

Also, it is conceivable that certain of the components or the details thereof, as shown in the preferred form of the invention, may be modified somewhat while incorporating the basic components and concepts taught. Consequently, this basic invention is not to be limited to the specific preferred form illustrated, but only by the scope of the appended claims and the reasonable equivalents thereto.

I claim:

1. An optical distance measuring apparatus comprising: light source means having optical means for forming an optical beam having a constant width blacked out portion; beam sweep means for sweeping said beam and said blacked out portion through an angle at a constant angular velocity across a distant point; and means of a predetermined size to receive said beam and indicate the time it takes said blacked out portion to sweep past said receiver means for calculation of the distance to said point.

2. An optical distance measuring apparatus comprising: light source means having optical means for forming an optical beam having a blacked out central portion of predetermined width; beam sweep means for sweeping said beam and central portion through an angle at a constant angular velocity across a distant point; reflector means at said distant point to reflect the light back to the source; detector means at said source of a predetermined size to receive the reflected beam; and indicator means connected to said detector means to indicate the time it takes said blacked out central portion to sweep past said detector means for calculation of the distance to said reflector means.

3. Apparatus for optically measuring distance between first and second points comprising: optical means at said first point forming a projected constant width optical shadow and straddling light; said optical means including a light source of collimated light rays, an objective lens with a darkened central portion, and prism means between said objective lens and said light source to diverge the collimated light rays past the edges of said darkened portion and through said objective lens said lens being so positioned with respect to said prism means as to create a constant width shadow and straddling light; beam oscillating means coupled to said optical means for sweeping the shadow and straddling light back and forth across the second point; detector means of a predetermined size to receive said beam sweep; and indicator means connected to said detector means to indicate the time it takes said shadow to sweep past said detector.

4. The apparatus in claim 3 wherein said beam oscillating means comprises a pair of transparent counter rotating wedges.

5. Apparatus for optically measuring distance between first and second points comprising: optical means at said first point forming a projected light beam with a central, constant width shadow zone, including a source of collimated light rays, a prism in the path of said rays, an objective lens with an opaque central area optically aligned with said prism and source and spaced from said prism an amount equal to the focal length of said objective lens; optical beam oscillating means coupled to said optical means to oscillate said beam and shadow zone at a substantially constant angular velocity; beam reflector means at the second point oriented to reflect said oscillating beam back to the first point; light detecting means of a predetermined size at said first point to receive the oscillating beam and emit an impulse signal indicative of the time it takes the shadow zone to sweep past said detecting means; and indicator means operably connected to said detecting means to indicate the duration of said signal thereby determining the distance between said first and second points.

6. The invention, as set forth in claim 5, wherein said optical beam oscillating means includes a pair of transparent rotating wedges.

7. The invention, as recited in claim 6, wherein said rotating wedges are positioned between said prism and said objective lens so as to be rotatable about the optical axis of said objective lens.

References Cited
UNITED STATES PATENTS
2,830,487   4/1958   Griffith.

RONALD L. WIBERT, *Primary Examiner.*

F. L. EVANS, *Assistant Examiner.*

U.S. Cl. X.R.
250—235